United States Patent
Yoshimura et al.

(10) Patent No.: US 6,506,852 B2
(45) Date of Patent: Jan. 14, 2003

(54) POLYESTER RESIN AND PROCESS FOR PRODUCING MOLDED PRODUCT THEREOF

(75) Inventors: Susumu Yoshimura, Kanagawa (JP); Takashi Tanabe, Kanagawa (JP); Katsuya Tokutomi, Kanagawa (JP); Takashi Fujimaki, Kanagawa (JP)

(73) Assignee: DJK Techno Science Laboratories, Inc., Kanagawa-ken (JP)

( * ) Notice: Subject to any disclaimer, the term of this patent is extended or adjusted under 35 U.S.C. 154(b) by 0 days.

(21) Appl. No.: 09/949,866

(22) Filed: Sep. 12, 2001

(65) Prior Publication Data

US 2002/0035218 A1 Mar. 21, 2002

Related U.S. Application Data

(63) Continuation of application No. 09/402,128, filed as application No. PCT/JP98/01505 on Apr. 1, 1998, now abandoned.

(30) Foreign Application Priority Data

Apr. 2, 1997 (JP) ............................................... 9-83877

(51) Int. Cl.$^7$ ............................................... C08G 63/91
(52) U.S. Cl. .......................... 525/438; 521/48; 525/450
(58) Field of Search ................................ 525/438, 450; 521/48

(56) References Cited

U.S. PATENT DOCUMENTS

| 4,870,110 A | 9/1989 | Mehra ........................ 521/46.5 |
| 5,418,297 A | 5/1995 | Isozaki ........................ 525/386 |

FOREIGN PATENT DOCUMENTS

| JP | 7-300518 | 11/1995 |
| JP | 8-508776 | 9/1996 |
| JP | 8-325407 | 12/1996 |
| JP | 9-509214 | 9/1997 |

*Primary Examiner*—Patricia A. Short
(74) *Attorney, Agent, or Firm*—Sughrue Mion, PLLC

(57) ABSTRACT

A method for producing a high molecular weight polyester having swell of 1–200 percent is described. In the method, a mixture consisting of (a) 100 parts by weight of a linear saturated polyester; (b) 0.3~10 parts by weight of a mixture, as a coupling agent, which is composed of (1) 0–100 percent by weight of a bifunctional epoxide ingredient containing 2 epoxide groups per molecule and (2) 100–0 percent by weight of a polyfunctional epoxide ingredient containing 3 and more epoxide groups per molecule; and (c) 0.01~5 parts by weight of metal salt of carboxylic acid as a catalyst for coupling reaction, is heated at a temperature higher than a melting point of said polyester resin.

12 Claims, 1 Drawing Sheet

① HO ——————— OH

② HO ——————— COOH

③ HO  OH

④

⑤

Note:

represent di-, tri-, tetra- functional groups, respectively.

POLYESTER RESIN AND PROCESS FOR PRODUCING MOLDED PRODUCT THEREOF

This is a continuation of application Ser. No. 09/402,128 filed Sep. 30, 1999, now abandoned the disclosure of which is incorporated herein by reference which was the National Stage of International Application No. PCT/JP98/01505, filed Apr. 1, 1998.

TECHNICAL FIELD

The present invention relates to a process for producing a polyester resin having increased molecular weight and improved processability by subjecting a polyester resin having relatively low molecular weight to a bond reaction using a small amount of a binder and a slight amount of a catalyst, and to a process for producing a polyester resin molded product. More particularly, the present invention relates to a process for producing a polyester resin having increased molecular weight and improved processability by restoring and improving a recovered or recycled polyester molded product with reduced molecular weight and physical properties, and a process for producing a polyester resin molded product having improved basic physical properties, mechanical characteristics, and the like.

BACKGROUND ART

Straight-chain aromatic saturated polyesters, such as polyethylene terephthalate (PET), polybutylene terephthalate (PBT), and polyethylene-2,6-naphthalene carboxylate (PEN), have excellent physical properties, and are widely used as fibers, films, plastics and the like. In the field of plastics, these kinds of polyesters are widely used as high performance resin materials for molded products for automobiles, machine parts, electric and electronic materials, building materials, containers, various industrial products and the like.

In recent years, with a view to saving resources and protecting the environment, the need to reutilize used plastic products recovered from factory production lines or the general consumer market has been recognized worldwide. Also, the recycling of used bottles, films and the like which are made of polyester has been positively progressing. However, such crystalline polyester has practical problems in that great decreases in molecular weight easily occur, and there is a strong tendency for the number of free carboxyl groups at the molecule terminals to increase due to the thermal history of mold working. This has hindered the development of reutilization techniques for recovered products. Since the molecular weight of recovered used polyester is decreased as compared with new chips, even flakes (crushed materials) derived from large amounts of recovered PET bottles, for example, have molecular weights substantially reduced by half. Therefore, using this as a base resin for reutilization will cause poor processability, where the original PET bottles cannot be made, but only monofilaments that can be formed with even low molecular weights may be formed. Thus, the current state of reutilization is limited to a narrow range applications.

As approaches for solving this problem, methods of restoring molecular weight by a solid phase polymerization of polyesters, of reacting a chain extender and polyester terminal groups, of adding other resins such as an elastomer to support mechanical characteristics, and the like are known.

As the chain extender, practical applications of compounds having functional groups, such as isocyanate, oxazoline, epoxy, aziridine, or carboimide have been proposed. However, practical compounds are limited because of strict restrictions in reactivity, heat resistance, stability and the like. Of these, epoxy compounds are relatively useful, and blends of monoepoxy compounds (Japanese Patent Laid-open No. Sho-57-161124), of diepoxy compounds (Japanese Patent Laid-open No. Hei-7-166419, Japanese Patent Publication No. Sho-48-25074, Japanese Patent Publication No. Sho-60-35944, and the like) are disclosed. However, there have been various problems in reaction rate, gel formation, melt viscosity, compatibility, heat stability, physical properties of the molded product, and the like.

On the other hand, a method of increasing the molecular weight of polyester by melting and mixing the recovered polyester with a bifunctional epoxy resin and a steric hindrance type hydroxyphenyl alkyl phosphorous acid ester hap been proposed (Japanese Patent Laid-open No. Hei-8-508776). Although this method may provide a relatively fast reaction rate, the steric hindrance type hydroxyphenyl alkyl phosphorous acid ester used is expensive, and there is a problem with practical use in the industry where low recovery and recycling costs are required. There have also been proposed methods of blending rubber or elastomers with the polyester, but in such case, there have been difficulties in compatibility, heat resistance, modulus of elasticity and the like.

DISCLOSURE OF THE INVENTION

An object of the present invention is therefore to provide a process for producing polyester resin pellets having increased molecular weight and molecular weight distribution and improved processability using a polyester resin having a relatively low molecular weight as a raw material, and a process for producing a molded product of the polyester resin.

As a result of extensive investigations to solve the above-mentioned problems, the present inventors have discovered that the above-mentioned object can be attained in an industrially advantageous fashion by blending a specific epoxy compound as a binder and a bond reaction catalyst with a saturated polyester followed by heat fusion to reach the completion of the present invention.

That is, the present invention provides, in one aspect thereof, a method for producing a high molecular weight polyester having swell of 1–200%, characterized by heating a mixture consisting of: (a) 100 parts by weight of a linear saturated polyester; (b) 0.3–10 parts by weight of a mixture, as a coupling agent, composed of (1) 0–100 percent by weight of a bifunctional epoxide ingredient containing 2 epoxide groups per molecule and (2) 100–0 percent by weight of a polyfunctional epoxide ingredient containing 3 and more epoxide groups per molecule; and (c) 0.01–5 parts by weight of metal salt of carboxylic acid as a catalyst for coupling reaction, at a temperature higher than a melting point of said polyester resin.

Further, the present invention provides the above mentioned production process, characterized in that metal salt is selected from a group consisting of a sodium salt and a manganese salt of carboxylic acid.

Also, the present invention provides the above mentioned production process, characterized in that the linear saturated polyester is a recycled molded product of polyester and having an inherent viscosity of 0.30–0.90 dl/g.

Still yet, the present invention provides the above mentioned production process, characterized in that the epoxide ingredient containing 2 epoxide groups per molecule contains at least one selected from a group consisting of aliphatic polyethyleneglycol diglycidylether, aromatic bisphenol A diglycidylether and its pre-condensate.

Also, the present invention provides the above mentioned production process, characterized in that the epoxide ingredient containing 3 epoxide groups per molecule contains at least one selected from a group consisting of aliphatic trimethylolpropane triglycidylether, an aromatic phenol novolac epoxy resin, a cresol novolac epoxy resin and bisresorcinoltetraglycidylether.

Additionally, the present invention provides a method of production of a high molecular weight polyester having swell of 1–200%, characterized by heating a mixture consisting of: (a) 100 parts by weight of a linear saturated polyester; (b) 0.3–10 parts by weight of a mixture, as a coupling agent, composed of (1) 0–100 percent by weight of a bifunctional epoxide ingredient containing 2 epoxide groups per molecule and (2) 100–0 percent by weight of a polyfunctional epoxide ingredient containing 3 and more epoxide groups per molecule; and (c) at least one coupling reaction catalyst selected from a group consisting of (1) carboxylate, carbonate, bicarbonate of alkali metal, (2) carboxylate of alkaline earth metal, (3) carboxylate of aluminium, zinc or manganese, (4) manganese carbonate, at a temperature higher than a melting point of said polyester resin.

Further, the present invention provides a polyester resin produced according to the above mentioned production process.

Also, the present invention provides a method for producing molded articles such as injection molding products, thin films, sheets, yarns, bottles and fibers by using the above mentioned polyester.

Further, the present invention provides a method for producing molded articles such as injection molded products, films, yarns, bottles and fibers comprising: heating a mixture of (a) 100 parts by weight of a linear saturated polyester, (b) 0.3–10 parts by weight of a mixture, as a coupling agent, consisting of (1) 0–100 percent by weight of a bifunctional epoxide ingredient contains 2 epoxide groups per molecule and (2) 100–0 percent by weight of a polyfunctional epoxide ingredient contains 3 and more epoxide groups per molecule, and (c) 0.01–5 parts by weight of metal salt of carboxylic acid as a catalyst for coupling reaction, at a temperature higher than a melting point of said polyester resin.

Additionally, the present invention provides the above mentioned production process for producing molded articles, characterized in that the linear saturated polyester is flakes of recycled PET bottles.

BRIEF DESCRIPTION OF THE DRAWINGS

FIG. 1 is a view showing a fundamental structure of a polyester resin, in which:

Figure 1:
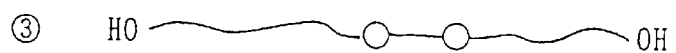
Figure 1:
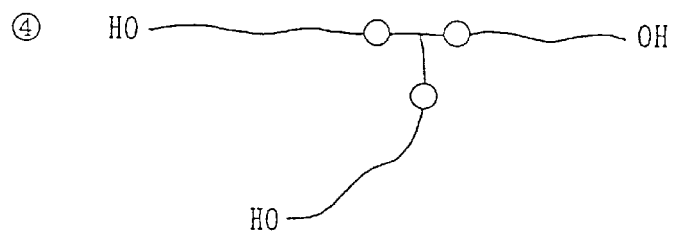
Figure 1:
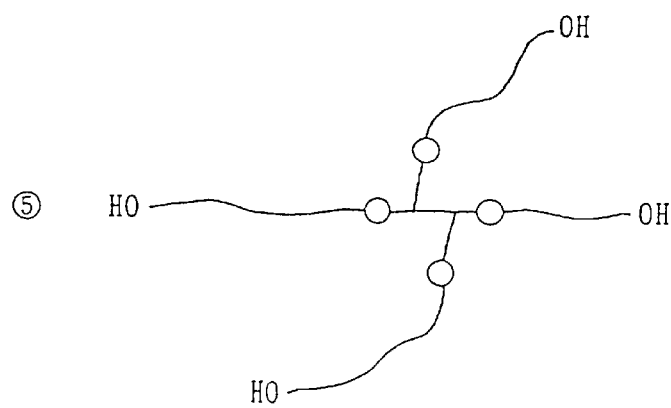
Figure 1:
Figure 1:
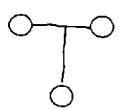
Figure 1:
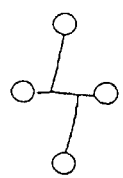

symbol ① denotes a commercially available polyester resin product (high molecular weight grade, linear structure);

symbol ② denotes a recovered polyester resin product (decreased molecular weight, linear structure);

symbol ③ denotes the polyester resin of the present invention which is connected with a bifunctional binder (high molecular weight, linear structure);

symbol ④ denotes the polyester resin of the present invention connected with a trifunctional binder (high molecular weight, long chain branched structure); and symbol ⑤ denotes the polyester resin of the present invention connected with a tri- or more functional binder (high molecular weight, long chain branched structure).

BEST MODE FOR CARRYING OUT THE INVENTION

The present invention will be explained in detail below.

Straight-chain Saturated Polyester

The straight-chain saturated polyester of component (a) as a raw material in the present invention is synthesized from a dicarboxylic acid component and a glycol component, or from a hydroxycarboxylic acid. Examples of the dicarboxylic component include aromatic dicarboxylic acids such as terephthalic acid, isophthalic acid, naphthlenedicarboxylic acid, diphenylcarboxylic acid, diphenylsulfondicarboxylic acid, diphenoxyethanedicarboxylic acid, diphenyletherdicarboxylic acid, methyl terephthalic acid, or methyl isophthalic acid; and aliphactic or alicyclic dicarboxylic acids such as succinic acid, adipic acid, sebacic acid, decanedicarboxylic acid, dodecanedicarboxylic acid or cyclohexanedicarboxylic acid. Of these, aromatic dicarboxylic acids, particularly terephthalic acid and 2,6-naphthalendicarboxylic acid, are preferable.

Examples of the glycol component include ethylene glycol, trimethylene glycol, tetramethylene glycol, hexamethylene glycol, decamethylene glycol, neopentyl glycol, cyclohexane dimethanol, polyoxyethylene glycol, polyoxypropylene glycol, and polyoxytetramethylene glycol. Of these, ethylene glycol, tetramethylene glycol and cyclohexane glycol are preferable.

Examples of the hydroxycarboxylic acid include α-hydroxycaproic acid, hydroxybenzoic acid and hydroxyethoxybenzoic acid.

The straight-chain saturated polyester to which the present invention can be applied may be one obtained by copolymerizing tri- or more functional compounds in a range where a straight-chain state may be substantially maintained. Examples of such a tri- or more functional compound include trimellitic acid, pyromellitic acid, trimethylol propane, and pentaerythritol.

Representative examples of the straight-chain saturated polyester include polyethylene terephthalate, polybutylene terephthalate, polyethylene-2,6-naphthalate or their copolymers. Polyethylene terephthalate is particularly preferable.

The straight-chain saturated polyester used in the present invention has an inherent viscosity of preferably 0.30 dl/g or more, more preferably 0.40 dl/g or more when measured at 25° C. by dissolving in 1,1,2,2-tetrachloroethane/phenol (1:1) mixed solvent. If the inherent viscosity is less than 0.30 dl/g, it is difficult to increase the molecular weight even by the present invention, and there is a fear that the polyester resin obtained may not always have excellent mechanical strength. The upper limit of the inherent viscosity is not particularly limited, but is generally 0.90 dl/g or less, preferably 0.80 dl/g or less.

In the case of using a recovered polyester product, the limit of the inherent viscosity is usually an inherent viscosity of its molded product, and is generally 0.40–0.80 dl/g, particularly 0.50–0.70 dl/g.

In the case of utilizing the recovered polyester molded product, the form of the molded product may be fibers, films, bottles and other molded products, and the polyester may contain a small proportion of other polymers such as polyolefins, or polyacrylic acid esters. Further, additives such as fillers, pigments or dyes may be contained in small amounts. In particular regard to PET bottles, as the social environment is getting organized for the recovery and recycling use thereof, and in addition, since the polyesters used in such bottles have compositions suitable for reutilization, such polyesters are suitable as the straight-chain saturated polyester that is a raw material of the present invention.

Binder

The binder of component (b) of the present invention is a compound having two or at least three epoxy groups in the molecule. In general, examples of the compound having two epoxy groups, on the average, in the molecule include aliphatic polyethylene glycol diglycidyl ether, polypropylene glycol diglycidyl ether, tetramethylene glycol diglycidyl ether, 1,6-hexamethylene glycol diglycidyl ether, neopentyl glycol diglycidyl ether, glycerin. diglycidyl ether, aromatic bisphenol A diglycidyl ether, an initial condensate of bisphenol A diglycidyl ether, terephthalic acid diglycidyl ether, and alicyclic hydrogenated bisphenol A diglycidyl ether.

Examples of the compound having at least three epoxy groups, on the average, in the molecule include trimethylol propane triglycidyl ether, triglycidyl isocyanurate, novolak epoxy resin, bisresorcinol tetraglycidyl ether, tetraglycidyl-diaminodiphenyl methane, tetraglycidylmeta-xylene diamine, and tetraglycidylbisaminomethyl cyclohexane.

The blending amount of this epoxy group-containing compound of component (b) is 0.3–10 parts by weight per 100 parts by weight of the straight-chain saturated polyester of component (a). In particular, 0.5–5 parts by weight are preferable. If the amount is less than 0.3 part by weight, the effect of chain extension is insufficient, the molecular weight does not increase, and basic physical properties or mechanical characteristics of the molded product are poor. If the amount exceeds 10 parts by weight, the modulus of elasticity of the molded product is lowered by the plasticization effect, or gel forms.

The present invention can use, particularly as a binder, a mixture of 0–100% by weight of a compound containing two epoxy groups in the molecule and 100–0% by weight of a compound containing at least three epoxy groups in the molecule. Swell (degree of swelling) appears even with the compound containing two epoxy groups in the molecule, and a small amount of long chain branches is formed. However, by increasing the use amount of the compound containing at least three epoxy groups in the molecule, the swell (degree of swelling) and long-chain branches can be increased to the desired extent.

Melt tension or extension viscosity of the polyester resin increases as the above increase, and in general, processability is improved. For example, by increasing the rate of crystallization of a resin, the injection molding cycle is shortened and productivity is improved. In inflation film molding, bubbles are stabilized and non-uniform film decreases. In T die film molding, neck-in decreases and film yield is improved. In sheet molding, drawdown properties are improved, and stable molding becomes possible. In particular, in polyester resins having large swell and melt tension, expansion molding can be easily conducted.

Bond Reaction Catalyst

The bond reaction catalyst as component (c) in the present invention is a catalyst containing at least one kind selected from the group consisting of (1) a carboxylate, a carbonate and a bicarbonate of an alkali metal, (2) a carboxylate of an alkaline earth metal, (3) a carboxylate of aluminum, zinc or manganese, and (4) a carbonate of manganese.

The above catalyst is divided into types of carboxylate of metal and other types. Examples of the metal for forming metal salts of carboxylic acid include alkali metals such as lithium, sodium or potassium; alkaline earth metals such as magnesium, calcium, strontium or barium; aluminum; zinc; and manganese.

The carboxylic acid for forming salts together with those metals may be either of monocarboxylic acids, dicarboxylic acids and other polycarboxylic acids, and also may be polymer-like carboxylic acids. The number of carbon atoms of the carboxylic acid is not particularly limited. However, the number of carbon atoms of the carboxylic acid is 1 or more, which influences the rate of crystallization of the highly polymerized polyester obtained. That is, in the case of using metal salts of medium and higher carboxylic acids, in particular medium and higher fatty acids, as a catalyst, a highly polymerized polyester in which the rate of crystallization is accelerated is obtained. Particularly preferable, a highly polymerized polyester in which the rate of crystallization is more accelerated can be obtained, if metal salts of high fatty acids are used as a catalyst.

As the particularly preferable higher carboxylic acids in carboxylic acids for forming the catalyst of the present invention, there are oxides of paraffin having an average molecular weight of 500–1000.

Long chain paraffins for which their oxides have an average molecular weight of 500–1000 are almost nonexistent naturally, and are generally obtained as a synthetic wax in producing synthetic petroleum from coal in a Fischer-Tropsch process. At present, only Sasol Ltd., of the Republic of South Africa, carries out a Fischer-Tropsch process on a commercial scale, and the long chain wax is commercially available as "Sasol Wax" from them. Sasol Wax includes straight type, high melting point paraffin waxes called H1, H2, C1 or C2, oxide types called A1, A6 or A7, and oxide saponification types called A2, A3 or A14, and any of these types can be used.

A particularly preferable bond reaction catalyst in the present invention is a manganese salt of carboxylic acid, and it acts as a catalyst for reaction between terminal carboxyl groups of the polyester resin and epoxy rings. The manganese salt is preferably a salt of an organic carboxylic acid, and suitable examples thereof are manganese salts of aliphatic carboxylic acids having 1–20 carbon atoms, particularly 1–10 carbon atoms, alicyclic carboxylic acids having 3–12 carbon atoms or aromatic carboxylic acids having 7–20 carbon atoms. Representative examples of the carboxylic acid for forming salts include acetic acid, propionic acid, butyric acid, caproic acid, adipic acid, stearic acid, cyclohexanecarboxylic acid, benzoic acid, and phthalic acid. Further preferable examples include manganous acetate, manganous acetate anhydride, manganous acetate tetrahydrate, and manganic acetate. In particular, manganous acetate tetrahydrate is preferable.

The blending amount of the manganese salt of carboxylic acid as the bond reaction catalyst is 0.01–5 parts by weight per 100 parts by weight of the straight chain saturated polyester of component (a). In particular, an amount of 0.05–1 part by weight is preferable. If the amount is less than 0.01 part by weight, the catalyst effect is small, so that reaction does not proceed sufficiently and the molecular weight does not increase sufficiently. If the amount exceeds 5 parts by weight, gel formation by local reaction, trouble in an extruder due to rapid increase of melt viscosity, or the like occurs.

Other Additives

In addition to the above-mentioned bond reaction catalyst of component (c), other additives can be added as co-catalyst, crystallization nucleating agent or crystallization accelerator. Examples of these additives include halides, carbonates or bicarbonates of alkali metals or alkaline earth metals, such as lithium chloride, potassium iodide or potassium carbonate; and alkali metal salts or alkaline earth metal salts, such as lithium salt, sodium salt, potassium salt, beryllium salt, magnesium salt, calcium salt, strontium salt or barium salt of aryl- or alkyl-substituted phosphines, such as tributyl phosphine, trioctyl phosphine or triphenyl phosphine, saturated fatty acids, such as butyric acid, valeric acid, caproic acid, lauric acid, myristic acid, palmitic acid, stearic acid, behenic acid or montanic acid, or unsaturated fatty acids, such as crotonic acid, oleic acid or elaidic acid.

Further, other than the polyester of component (a), the epoxy-containing compound of component (b) and the bond reaction catalyst of component (c), the polyester resin composition of the present invention may optionally contain fillers such as talc, calcium carbonate, calcium oxide, kaolin, alumina or aluminum oxide; reinforcements such as glass fibers, carbon fibers, aramide fibers or whiskers; pigments such as carbon black, antimony oxide, molybdenum disulfide or titanium oxide; coloring materials; stabilizers; ultraviolet absorbers; antioxidants; viscosity modifiers; antistatic agents; conductive agents; fluidity imparting agents; release agents; other crosslinking agents and other resins.

Blending Method and Bond Reaction

A method of blending the polyester resin of the present invention will be explained below.

The polyester of component (a) which can be used is one having any form, such as general virgin chips, recovered flakes, granular materials, powder, chips or the like. Drying is also optional. In general, drying the polyester as the main component gives preferable results. Each component is kneaded with a mixer such as a Henschel mixer, and the mixture is supplied to an extrusion pelletizer or directly supplied to a molding processing machine. Heat melting temperature is preferably equal to or more than the melting point of the polyester and 330° C. or lower from the standpoint of reaction control. In particular, 320° C. or lower is preferable. If the temperature exceeds 330° C., discoloration or thermal decomposition of the polyester may occur. Other than the method of simultaneously mixing each component, it is also possible to previously mix component (a) and component (b), and then add component (c) thereto in an optional step. Further, it is possible to previously mix component (a) and component (c), and then add component (b) in an optional step.

As a reaction apparatus for heat melting, a single screw extruder, a twin screw extruder, a two stage extruder combining them, a kneader/ruder or the like can be used.

In the case of conducting injection molding, film formation, yarn formation, hollow molding, spinning or the like, pellets previously produced by an extrusion molding machine may be used, or a raw mixture obtained by dry blending the above three components can be directly supplied to a feeder of a processing machine. It is important to select the optimal blending composition, taking into consideration the number of stages of kneading steps or heating conditions. Molding speed, mold temperature and stretching conditions during molding can be optionally selected, and in some cases, the molded product obtained may be heat-treated later.

The reason why the degree of polymerization of the straight chain polyester increases within a short time of, for example, 1–60 minutes, preferably 2–30 minutes, particularly preferably 4–15 minutes, and the amount of terminal carboxyl groups decreases is assumed to be that since the bond catalyst has an acceleration action to the reaction between the carboxyl group of the polyester and epoxy ring, and molecules of polyester having terminal carboxyl groups are connected by a polyfunctional epoxy component, so that molecular chain extends or branches to become high molecular weight, and at the same time, the amount of terminal carboxyl groups decreases. When only the bond catalyst is added to the polyester and heat melting is conducted, no increases in molecular weight and decreases in the terminal carboxyl groups are recognized. When only the polyfunctional epoxy component is added to the polyester and heat melting is conducted, reaction rate is slow, so that it is difficult to increase the molecular weight for a short period of time. Only when the three components (a), (b) and (c) of the present invention are present together, a marked increase in molecular weight is recognized.

According to the present invention, polyester having an increased molecular weight, and having, for example, an inherent viscosity of 0.40–2.0 dl/g, to the raw material polyester having an inherent viscosity of, for example, 0.30–0.90 dl/g can be obtained by a simple means in a short period of time. The degree of increase in viscosity depends on an inherent viscosity of the raw material polyester or an inherent viscosity of the objective polyester. However, in general, when a polyester having a low inherent viscosity of, for example, 0.30–0.5 dl/g is used as the raw material, the amount of increase of an inherent viscosity is increased, and when a raw material having a high inherent viscosity of, for example, 0.70–0.9 dl/g, is used, it is sufficient to be a relatively small increase amount. In general, the increase amount of the inherent viscosity is in a range of 0.1–1.1 dl/g, preferably 0.20–0.70 dl/g.

EXAMPLE

The present invention will be described in more detail in the following examples and comparative examples. Also, some analytical devices used for evaluating the material properties, and measurement conditions are shown below.

The measurement of the molecular weight was based on GPC (Gel Permeation Chromatography).

Showa Denko K.K.: SYSTEM-21

Column (both for sample and reference side): Shodex KF-606M (two)

Solvent: Hexafluoroisopropylalcohol

Column temperature: 40° C.

Flow rate: 0.6 ml/min

Polymer concentration: 0.15 percent by weight

Detector: Shodex RI-74

MFR was determined at a temperature of 280° C. and a load of 2.16 kg in accordance with JIS K6760.

Swell was determined as follows:

A sample was loaded into the melt indexer for MFR measurement at 280° C. under a load of 2.16 kg. When 20 mm of sample hung out the sample was cut off and the diameter at 5 mm from the bottom of the cut sample was measured, and swell was calculated according to the following equation:

$$\text{Swell (percent)} = [(\text{the average value of the sample diameter} - 2.095)/2.095] \times 100$$

The diameter was actually measured several times, and that average value was adopted.

Also, in the equation, the figure "2.095" is the nozzle diameter of MFR melt indexer.

Inherent viscosity was determined by using the mixed solvent of the same weight of 1,1,2,2-tetrachloroethane and phenol at 25° C.

Examples 1–5

Production of Polyester Pellets A–E With Coupling Agents of Bifunctional Aliphatic Epoxides The following three components of (1) 100 parts by weight of recycled PET bottle flakes as a linear saturated polyester (supplied from Fujitec Co., Ltd., an inherent viscosity 0.564 dl/g, terminal carboxyl group value 45 equivalent/10⁶ g, and water contents of 0.6% or less) which was dried at 130° C. for 6 hours, and (2) as a coupling agent, 1.0, 1.5, 2.0 and 2.2 parts by weight respectively, of bifunctional aliphatic epoxy compounds of polyethyleneglycol diglycidylether, EGDGE (produced by KYOEISHA CHEMICAL CO., LTD, light yellow liquid) of different molecular weight, that is, Epolite 40E, 200E and 400E, respectively) and (3) as a coupling reaction catalyst, 0.1 parts by weight of Al.Na salt of Sasol wax were mixed [referred to as flake mixture[1]].

By using a S1 type KRC kneader (manufactured by KURIMOTO, LTD., screw diameter: 25 mm, unidirectional twin screw type, L/D ratio: 10, rotation speed: 81–324 rpm,), a coupling reaction was carried out while setting the temperature of the extruder screw and the die at 280° C. and controlling retention time by changing rotation speed of screw under the fixed feed rate of the flake mixture [1] from a hopper under a dried nitrogen gas atmosphere.

Strands were extruded continuously from die nozzles with a 3 mm diameter into water, and were cut with a rotary cutter into pellets. The thus obtained resin pellets A–E had a transparent and highly brilliant appearance, and were dried with hot air at 130° C. for 3 hours and stored in a moisture-proof bag or moisture-proof container.

Reaction conditions and basic properties of the resin of the present invention are shown in Table 1 in comparison with commercial PET pellets of Comparative Examples 1 and 2.

The resin pellets A–E of this invention have the characteristics that MFR is well controlled in about 1–20 g/10 min and swell is as large as about 40–60%, and have excellent processability in comparison with 2 kinds of commercial PET which generally have linear structure.

Moreover, the resin pellets D (Example 4) and E (Example 5) which typically represent this invention have high molecular weights and wide molecular weight distributions such as Mw 32,200, Mn 9,380 and Mw/Mn=3.4, Mw 37,200, Mn 10,300 and Mw/Mn=3.6 respectively.

Further, the amounts of terminal carboxyl groups of this resin pellets D and E decreased lower than the minimum detectable value of the chemical analysis.

The resin pellets of this invention have excellent processability because of the high melt viscosity and low MFR and wide molecular weight distribution in spite of smaller molecular weight than commercial polyester resins.

These measured values suggest the formation of a molecular structure with a few (probably, one less than one per molecule) long chain branches.

It is theoretized that in a coupling reaction between terminal carboxyl groups of 2 molecules of the low molecular weight linear structure PET (② of FIG. 1) and a bifunctional epoxide will yield only a linear structure (③ of FIG. 1) having twice the molecular weight. However, in the present invention, it can be assumed that the hydroxyl group newly produced by the coupling reaction with the terminal carboxyl groups and the epoxy ring and another bifunctinal epoxide recombinate to produce the above mentioned long chain branched structure (④ of FIG. 1).

Comparative Example 1–2

Commercial PET

Basic properties determined for two kinds of commercial PET are shown in Table 1.

These kinds of commercial PET had a Mw 42,500, Mn 16,900, Mw/Mn=2.5 (Comparative Example 1) and a Mw 50,500, Mn 18,200 and Mw/Mn=2.8 (Comparative Example 2) respectively showing narrow molecular weight distributions.

As seen from Table 1, these two kinds of comparative commercial PET shows minus swell values (almost zero), characteristics of linear structure, and are therefore obviously different from the long chain branch structure of this invention whose swell values are comparatively large.

TABLE 1

| Example | Epoxide EGDGE | Added (parts) | Time (min) | Resin | Swell (%) | MFR (g/10 min) | IV* (dl/g) |
|---------|---------------|---------------|------------|-------|-----------|----------------|------------|
| Ex1 | Epolight 40E | 1.0 | 50 | A | 44 | 13.6 | 0.952 |
| Ex2 | Epolight 40E | 1.0 | 40 | B | 43 | 21.0 | 0.910 |
| Ex3 | Epolight 200E | 1.5 | 30 | C | 54 | 13.7 | 0.945 |
| Ex4 | Epolight 400E | 2.0 | 25 | D | 55 | 11.2 | 0.964 |
| Ex5 | Epolight 400E | 2.2 | 25 | E | 58 | 1.1 | 1.09 |
| CE1** | Commercial (linear structure) | | | | −0.23 | 11.0 | 0.966 |
| CE2** | Commercial (linear structure) | | | | −0.15 | 1.2 | 1.19 |

[Note]
EGDGE: Polethyleneglycol diglycidylether
Epolight 40E contains one monomer unit of polethyleneglycol, Epolight 200E contains 4 monomer units, Epolite 400E contains 9 monomer units.
MFR: 280° C., load 2.16 Kg
*IV = inherent viscosity
**CE = Comparative Example Examples 6–8

Production of Polyester Pellets F–H with Bifunctional and Polyfunctional Epoxides as Coupling Agents Resin pellets F–H were produced in the same manner as described in Examples 1–5, except that (1) recycled flakes of PET bottles of the inherent viscosity 0.678 dl/g, (2) 1–1.5 parts by weight of bifunctional aliphatic epoxy resin as a coupling agent of polyethyleneglycol diglycidylether: EGDGE (products of KYOEISHA CHEMICAL CO., LTD., light yellow liquid : Epolight 400E) and additional polyfunctional epoxy resin, and (3) 0.2 parts by weight of manganese(II) acetate 4 hydrate as a catalyst for coupling reaction. Results are shown in Table 2.

The resin pellets F–H of this invention have controlled MFR in about 0.6–12 g/10 min and larger swell values of about 110–190%, and processability was further improved. It can be assumed that long chain branch structures (④ and ⑤ of FIG. 1) were formed.

TABLE 2

| Example | Epoxide | Added (wt parts) | function (group) | resin | swell (%) | MFR (g/10 min) | IV (dl/g) |
|---|---|---|---|---|---|---|---|
| Ex6 | Epolight 400E | 1.5 | 2 | F | 110 | 12.2 | 0.962 |
|  | Epolight 100MF | 0.50 | 3 |  |  |  |  |
| Ex7 | Epolight 400E | 1.0 | 2 | G | 160 | 2.0 | 1.12 |
|  | Epolight 100MF | 0.75 | 3 |  |  |  |  |
| Ex8 | Epolight 400E | 1.5 | 2 | H | 190 | 0.62 | 1.20 |
|  | PH-NV-EP | 0.50 | many |  |  |  |  |

[Note]
Reaction conditions: 280° C., 20–30 min
MFR: at 280° C. and 2.16 Kg load
Epolight 400E: polyethylene glycol diglycidyl ether containing 9 ethyleneglycol monomer units
Epolight 100MF: trimethyrolpropane triglycidylether
PH-NV-EP: Phenol novolak epoxy resin Example 9

Production of Resin Pellets

To 100 parts by weight of recycled flakes of polyethylene terephthalate having an inherent viscosity 0.678 dl/g and dried at 140° C. for 6 hours, 1 part by weight of Epikote 815 (product of Yuka-Shell Epoxy Co., main component being bisphenol A glycidylether), and 0.2 parts by weight of manganese (II) acetate 4 hydrate were added, and mixed with a Henschel mixer.

This flake blend was extruded into 3 strands by using a 43 mm φ unidirectional twin extruder (Hermann Berstorff Maschinenbau GmbH (Hannover), segment type) at a barrel temperature of 280° C., and a 40 kg/hr extruding rate. The extruded strands were cooled in water and cut by a rotary cutter into pellets.

The thus obtained pellets were dried and stored in a moisture-proof container. Inherent viscosity of the pellets was 1.02 dl/g, MFR was 6.2 g/10 minutes and swell was 49%.

According to the Examples, molecular weight rose drastically at a short residence time of a few minutes, and gel formation due to side reactions such as a heterogeneous reaction barely occurs, so stable extruding operations can be carried out for long periods of time.

For the purpose of comparison, extruding operation was done in the same manner except that only dried flakes were used without adding epoxide components and catalytic components. The inherent viscosity of the obtained pellets was, however, 0.63 dl/g, so MFR can not be measured, and molecular weight decreased rather than increased.

Examples 10–11

Preparation of Sheets from Resin Pellets [1]

With a compact mono-axial extruder of 20 mm φ equipped with a T-die 200 mm wide, resin pellets [1] were extruded at 300° C. into un-stretched sheets 100, 200 and 300 μm thick respectively. Next, the 200 μm thick un-stretched sheet was stretched mono-axially four fold at 90° C. to make a mono-axially stretched film (Example 10).

Furthermore, a mono-axially stretched film which was made from the 300 μm thick un-stretched sheet in the same manner as described above was stretched with bi-axial stretching machine at 100° C., two fold in the transverse direction to make a bi-axially stretched film (Example 11).

The mechanical characteristics of the sheet and films in these Examples are shown in Table 3.

TABLE 3

| Example |  | Example 9 | Example 10 | Example 11 |
|---|---|---|---|---|
| Sheet |  | un-stretched | mono-axially stretched | biaxially stretched |
| Pellets used |  | Example 9 | Example 9 | Example 9 |
| Yield strength | MD | 7.7 | 31.2 | 11.7 |
| (kg/mm²) | TD | 8.5 | 3.4 | 25.5 |
| Yield ductility | MD | 3.5 | 6.2 | 23 |
| (%) | TD | 4.6 | 9.2 | 6.5 |
| Tension modulus | MD | 326 | 1387 | 560 |
| (kg/mm²) | TD | 450 | 257 | 1132 |

[Pull rate: 50 mm/min, at 23° C.]

Example 12

Production of Inflation Film from Flake Mixture

The flake mixture of Example 7 was tested using the inflation film making machine described below:
Molding machine: an inflation molding machine for LDPE (mono-axial, tandem type, a screw diameter 40 mm φ, L/D ratio=26, and 60 mmφ, L/D ratio=18) (manufactured by YOSHI CO., LTD)
Diameter of Die: 100 mm φ (lip clearance 1.0 mm, designed for LDPE)
Air ring: vertical blow up type (manufactured by PLACO Co., LTD).
Resin temperature at die outlet: 270° C.,
Blow ratio: 2.6
Film thickness: 30 μm
Take up speed: 25 m/min During a molding test for 2 hours, stable film making was performed.

Also, deviation in film thickness was within the range of 28–34 μm when 4 points of sample were determined every half hour.

On the other hand, when this film was dissolved in hexafluoroisopropylalcohol and analyzed by the SEC-MALLS method, several long chain branchs were detected.

Examples 13–15

A variety of molding processes were tried and assessed using the resin pellets of Example 9 of this invention. Injection moldability by JIS die, bottle moldability by direct blow and injection blow and multi-filament moldability were all excellent.

Applicability in the Industrial Use

The restricted number of applicable fields for recycled polyester from the general consumer market due to the inevitable decrease in molecular weight can be broadened by the present invention wherein the desired molecular weight and physical properties of a polymer can be restored easily. Thus the present invention can greatly contribute to effective use of recycled resources.

What is claimed is:

1. A method for producing pellets of a high molecular weight polyester having swell of 60–200%, characterized by heating a mixture consisting of: (a) 100 parts by weight of a linear saturated polyester; (b) 0.3–5 parts by weight of a mixture, as a coupling agent, composed of (1) 0–75 percent by weight of a bifunctional epoxide ingredient containing 2 epoxide groups per molecule and (2) 100–25 percent by weight of a polyfunctional epoxide ingredient containing 3 or more epoxide groups per molecule; and (c) 0.01–5 parts by weight of metal salt of carboxylic acid as a catalyst for coupling reaction, at a temperature higher than a melting point of said polyester resin, pelletizing a resulting resin.

2. A method of production according to claim 1, characterized in that metal salt is selected from a group consisting of a sodium salt and a manganese salt of carboxylic acid.

3. A method of production according to claim 1, characterized in that the linear saturated polyester is a recycled molded product of polyester.

4. A method of production according to claim 1, characterized in that the linear saturated polyester is a recycled molded product of polyester and having an inherent viscosity of 0.30–0.90 dl/g.

5. A method of production according to claim 1, characterized in that the epoxide ingredient containing 2 epoxide groups per molecule contains at least one selected from a group consisting of aliphatic polyethyleneglycol diglycidylether, aromatic bisphenol A diglycidylether and its pre-condensate.

6. A method of production according to claim 1, characterized in that the epoxide ingredient containing 3 epoxide groups per molecule contains at least one selected from a group consisting of aliphatic trimethylolpropane triglycidylether, an aromatic phenol novolac epoxy resin, a cresol novolac epoxy resin and bisresorcinoltetraglycidylether.

7. A method of production of pellets of a high molecular weight polyester having swell of 60–200%, characterized by heating a mixture consisting of: (a) 100 parts by weight of a linear saturated polyester; (b) 0.3–5 parts by weight of a mixture, as a coupling agent, composed of (1) 0–75 percent by weight of a bifunctional epoxide ingredient containing 2 epoxide groups per molecule and (2) 100–25 percent by weight of a polyfunctional epoxide ingredient containing 3 or more epoxide groups per molecule; and (c) at least one coupling reaction catalyst selected from a group consisting of (1) carboxylate, carbonate, bicarbonate of alkali metal, (2) carboxylate of alkaline earth metal, (3) carboxylate of aluminum, zinc or manganese, (4) manganese carbonate, at a temperature higher than a melting point of said polyester resin, and pelletizing a resulting resin.

8. A polyester resin produced according to claim 1.

9. A method for producing molded articles such as injection molding products, thin films, sheets, yarns, bottles and fibers by using the polyester resin according to claim 8.

10. A method for producing molded, articles the method comprising: heating a mixture of: (a) 100 parts by weight of a linear saturated polyester; (b) 0.3–5 parts by weight of a mixture, as a coupling agent, consisting of (1) 0–75 percent by weight of a bifunctional epoxide ingredient containing 2 epoxide groups per molecule and (2) 100–25 percent by weight of a polyfunctional epoxide ingredient containing 3 or more epoxide groups per molecule; and (c) 0.01–5 parts by weight of metal salt of carboxylic acid as a catalyst for coupling reaction, at a temperature higher than a melting point of said polyester resin, to make a high molecular weight polyester having swell of 60–200%, and dispensing a resulting resin directly into a die or mold to produce a molded article selected from the group consisting of injection molded products, films, yarns, bottles, and fibers.

11. A method for producing molded articles according to claim 10, characterized in that the metal salt of carboxylic acid is selected from a group consisting of sodium and manganese salt of a carboxylic acid.

12. A method for producing molded articles according to claim 10, characterized in that the linear saturated polyester is flakes of recycled PET bottles.

* * * * *